Jan. 4, 1927.
T. UMETSU
1,613,301
GYROSCOPIC DEVICE
Filed July 31, 1925   3 Sheets-Sheet 1
Fig. 1
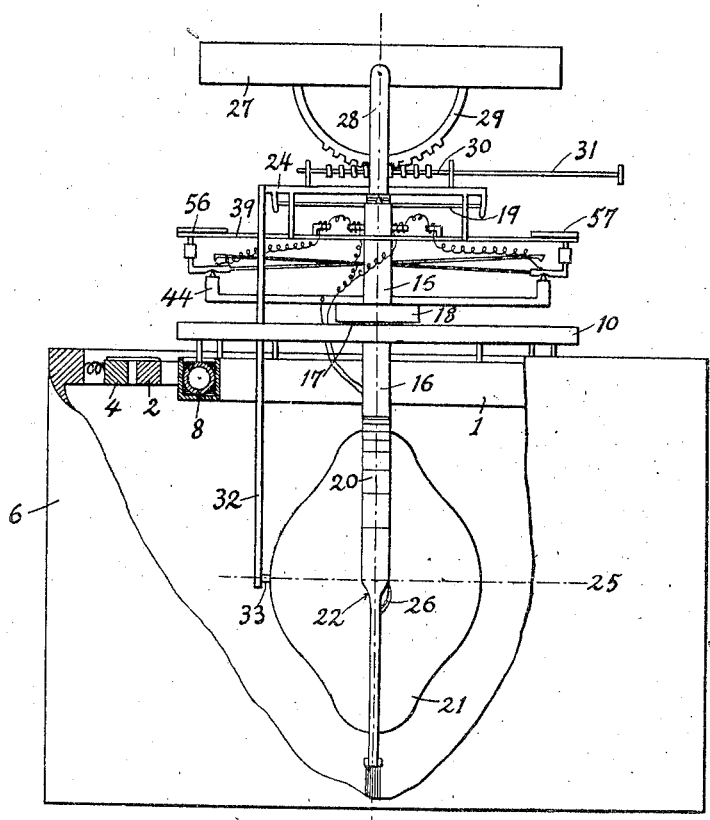
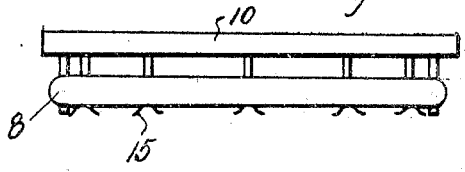
Fig. 6
Inventor:
Tadayoshi Umetsu
By ... 
Attorney.

Jan. 4, 1927. 1,613,301
T. UMETSU
GYROSCOPIC DEVICE
Filed July 31, 1925    3 Sheets-Sheet 2
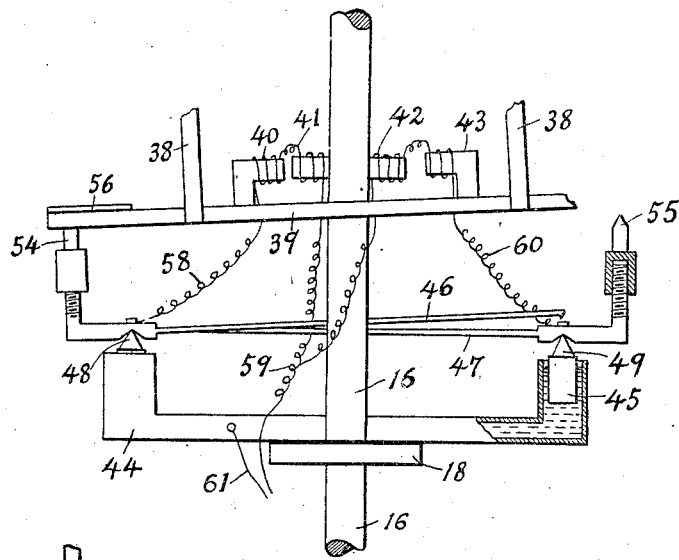
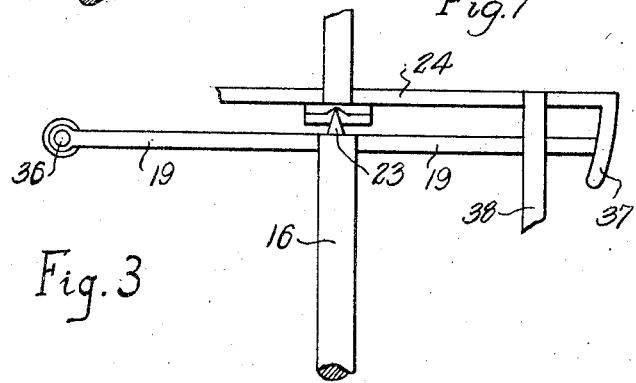
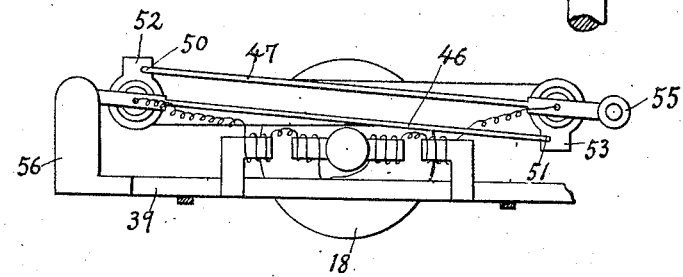
Inventor:
Tadayoshi Umetsu
By
Attorney Patented Jan. 4, 1927.

1,613,301

UNITED STATES PATENT OFFICE.

TADAYOSHI UMETSU, OF SAIHAKU-GUN, JAPAN.

GYROSCOPIC DEVICE.

Application filed July 31, 1925. Serial No. 47,362, and in Japan June 2, 1925.

This invention relates to a gyroscopic device for establishing a fixed horizontal plane on a moving body, or more precisely to a gyroscopic device for holding an instrument or other device on a moving body, such as a ship or an aircraft, at a fixed angular relation to a horizontal plane.

According to this invention a true horizontal plane formed by a heavy liquid such as mercury contained in an open vessel, which is suspended so as to be freely rotatable around three axes, is taken as a standard of reference, and the slightest deviation of the axis of the gyroscope from the horizontal position is made to cause controlling means to operate in one or the other direction, calling forth a force acting to suppress such deviation. This force, which counteracts said deviation of the gyroscope, causes the wheel to precess in a horizontal plane, which motion, when opposed in the horizontal plane, will in turn call forth a precession in the vertical plane, driving the gyroscope in the same direction as it would have been driven by the direct action of the controlling means. In consequence of this precession in the vertical plane, the first named deviation will be totally suppressed, and the wheel will shoot over the position of equilibrium, and thus will cause the controlling means to operate in the opposite direction. In this wise, the gyroscope will swing within the limits of a small predetermined range in the vertical and horizontal planes, holding itself in a true horizontal direction in the practical sense of the word.

When a gyro-wheel possessing freedom of movement about three axes is controlled, as in this invention, by the aid of means acting to suppress any deviation of the axis of rotation of the gyroscope from the horizontal position, the device will behave in one of the following manners according to the circumstances:—

(a) When a couple is applied to the wheel in a vertical plane, it will precess in the horizontal plane and the motion will have no direct effect upon the controlling means.

(b) Rotation of the earth around its own axis or the change of latitude due to the change of position of the ship or the aircraft will have an effect of causing the rotating gyro-wheel to incline with respect to a horizontal plane which varies from instant to instant. The tilt of the wheel caused thereby will call the controlling means into play, making the wheel precess in a horizontal plane.

(c) When a couple is applied to the wheel in a horizontal plane, a precession is called forth to take place in a vertical plane, causing the controlling means to exert a force to oppose the resulting vertical movement, and in this case also a precession in a horizontal plane results.

In each of these instances, the disturbances to which the gyroscope is subjected are finally reduced to a horizontal precessional motion, which when opposed or controlled will again lead to a precession in a vertical plane which takes place in such a direction that it would have resulted directly from the first applied force. That is to say, in the first case above mentioned, the gyroscope will become inclined and subjected to the action of the controlling means. In the second case, after it has assumed the horizontal direction momentarily, it will shoot over to the opposite side, to be again acted upon by the controlling means in the opposite direction. In the third case, a precession in the opposite direction in the horizontal plane will result.

To summarize, the behavior of the device according to this invention, when disturbed and when properly restricted in its horizontal motion, will be a swing in one direction in a vertical plane, then in one direction in a horizontal plane, then in the opposite direction in the vertical plane, and then in the opposite direction in the horizontal plane, the swings in the horizontal and vertical planes taking place in an alternate manner. When the amplitudes of the oscillation are restricted, horizontally and vertically, to narrow limits, the axis of the gyroscope will remain practically horizontal, and the parts attached thereto will assume a position which has a constant angular relation with respect to a horizontal plane.

The gyroscopic device according to this invention, as above described, enables a body to be held at a fixed angular position with respect to a horizontal plane. If two of such devices are provided, it will be possible to form a table of reference upon a moving body, such as a ship or an air-craft, which will be sufficiently firm to support an instrument or some other object of a comparatively light weight, and will provide for various applications in the devices which require a horizontal plane as a plane of reference in their operation. For example, a set of two gyroscopic devices disposed in perpendicular relation to each other may be connected, by means of an electrical controlling device of a suitable type, to a platform which is properly geared to the deck, so that the platform is moved relatively to the deck in such a way as to always maintain itself in a horizontal position regardless of the rolling and pitching motions of the ship, and then it will be possible to mount an article of considerable weight upon this platform.

In the accompanying drawing is illustrated an application of my invention to an optical sighting apparatus, such as a telescope, for obtaining a steady field of view to sight an object in spite of the rolling motion of a ship or an air-craft, on which the apparatus is mounted. In the said drawing:

Figure 1 is a front view, partly in section, of one form of the gyroscopic device according to my invention.

Figure 2 is a front view, partly in section and partly broken away, of the control magnets, switch bars and the mercury level.

Figure 3 is a plan view of same.

Figure 6 is a side view of said disc, together with the annular float connected thereto.

Figure 7 is a front view of the top part of the main vertical shaft with a supporting board pivotally mounted thereon.

Figure 8 is a side view of Figure 7.

Figure 4:
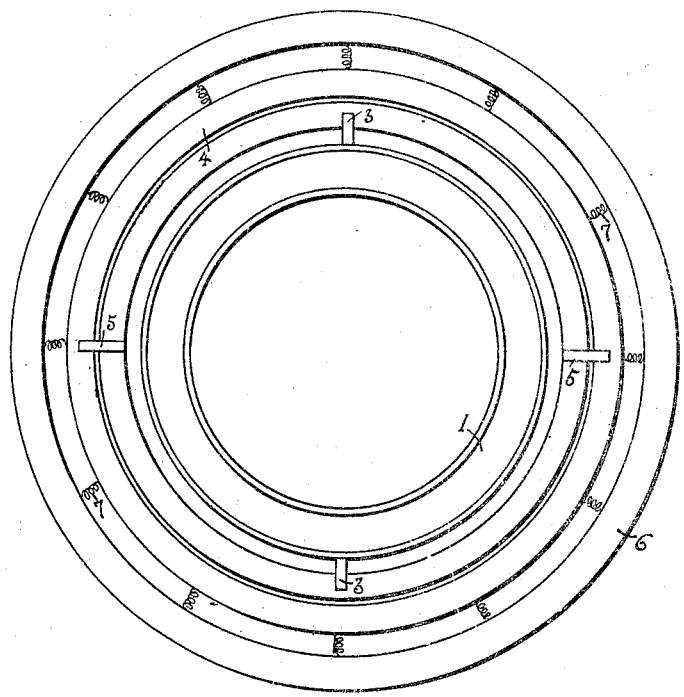
Figure 4 is a plan view of the apparatus from which the gyrowheel and all the parts connected therewith have been removed, showing the outer casing, gimbal rings and annular mercury trough only.

Referring more particularly to the numerals of reference on the drawing, 1 is an annular mercury trough pivotally suspended from the ring 2 by means of journals 3, 3. The ring 2 is pivotally suspended from the ring 4 by means of journals 5, 5. The ring 4 is in turn suspended from the outer casing 6 by means of a number of spiral springs 7. The journals 3, 3 and 5, 5 are situated mutually at right angles to each other. In this manner the mercury trough is practically free from rolling and pitching motions and tremors transmitted to the outer casing.

Figure 5:
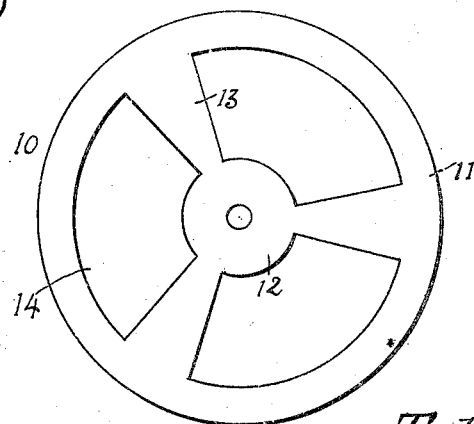
Figure 5 is a plan view of the foundation disc.

In the mercury trough 1 which is filled with mercury is an annular float 8. snugly fitting the inside of the trough. On this float is mounted, by means of pillars 9, a foundation disc 10 (Figures 5 and 6). This disc 10 consists of a circumferential portion 11 and the central portion 12 connected thereto by the radial portions 13 leaving therebetween openings 14. The float 8 is provided at the bottom thereof with resilient springs 15 to further dampen vibrations.

The gyro-wheel together with all its dependent parts mounted upon the vertical main shaft 16 are arranged to rotatably rest upon the foundation disc 10 by means of the ball bearing 17 provided between the said disc and the flange 18 rigidly secured to the shaft 16.

The main vertical shaft 16 which is rotatable together with the flange 18 relative to the foundation disc 10 is provided, at the upper end thereof, with a pair of laterally extending horizontal bars 19, 19, the lower portion of the said shaft extending downwardly through the disc 10, and being bifurcated to form a ring 20 to pivotally support the gyroscope casing 21 at trunnions 22. At the top of the shaft 16 is provided a knife edge 23, upon which is pivotally mounted a horizontal supporting board 24, so that the board 24 is rotatable in the plane including the axis 25 of the gyroscope but will rotate together with the main shaft 16 about the vertical axis. The gyroscope consists of the rotor element of a three phase induction motor, the stator being fixed inside the casing 21, and is operated by three phase current fed through the cable 26.

The supporting board 24 is one which is intended to be maintained horizontal. This is the part of the device upon which an instrument of observation or any other desired apparatus is to be mounted. In the instance shown in the drawing, which is to be taken as a mere example, a telescope 27 is mounted thereon through the intermediary of vertical stems 28. To the telescope, a semicircular toothed wheel 29 is attached, gearing with the worm 30 which is provided on the operating handle 31.

The supporting board 24, with the parts mounted thereon, would be freely rotatable, in a vertical plane, on the knife-edge 23, if it had not been constrained to move in unison with the gyroscope by means of the vertical connecting rod 32 pivoted at one end to the supporting board and at the other end to a projection 33 provided on the gyroscope casing lying on the axial line 25. By this means the supporting board 24 and the axis of the gyroscope are connected so as to be in parallel relation all the time, the oscillating motion of the supporting board 24 in a vertical plane being guided by projection 34 attached to the rear wall of the knife edge 23 and extending clear up to the downwardly projecting lug 35 provided on the rear wall of the supporting board, and a pair of adjusting screws 36 provided at each end of the horizontal bars 19, adjusted so as to nearly touch with the depending arcuate extensions 37 provided at each end of the supporting board 24 (Figures 7 and 8).

From the supporting board 24 is suspended, by means of a pair of connecting rods 38 securely attached thereto, a control board 39, so that this board 39 will always move in parallel relation with the supporting board 24 and consequently with the axis of the gyroscope. On the control board 39 are provided electromagnets 40, 43 cooperating with the adjacently situated electromagnets 41, 42 securely mounted on the vertical shaft 16.

Rigidly mounted upon the flange 18, which is rotatable upon the foundation disc 10, is a mercury level 44 consisting of a U-shaped vessel filled with mercury. In the vertical leg portions of this mercury level are arranged cylindrical floats 45, 45.

In the space between the control board 39 and the mercury level 44 are provided a pair of switch bars 46, 47 pivotally mounted upon the knife edges 48 49 provided upon the top ends of the cylindrical floats 45, 45. Each of these switch bars consists of a long horizontal portion and a short vertical portion. The long horizontal portions extend right up to the opposite end of the mercury level and are formed with contact points 50, 51 respectively to come into contact with the extensions 52, 53 made on the leg portions of the mercury level, while the short vertical portions extend half way up toward the control board and are provided with adjustable contact points 54, 55 respectively to co-operate with the contact pieces 56, 57 provided at the ends of the control board 39. The distribution of weight in each of the switch bars 46, 47 with respect to the respective points of suspension is such that the long horizontal portions overbalance the short vertical portions.

The electromagnets 40 and 41, being in series, are connected on the one hand, through the line 58, to one of the switch bars 46, and on the other hand, through line 59, to one side of the source of electricity. In the same way, the electromagnets 42 and 43, being in series, are connected on the one hand, through the line 60, to the other switch bar 47, and on the other hand, through the line 59, to the same side of the source of current. The U-shaped mercury level 44 is connected to the other side of the source of current through the line 61.

The contact pieces 56 and 57 are suitably insulated from the control board 39, the knife edges 48 and 49 are insulated from the floats 45, 45, and the mercury level 44 is insulated from the flange 18.

When the contact point at the end of the horizontal portion of one of the switch bars, say 47, makes contact with the extension 52 provided at the upper edge of the mercury level, the electrical circuit of the electromagnets 42 and 43 will close through the line 61 leading from one side of the source of electricity to the mercury level 44, to the extension 52 at the left end of the level, then to the switch bar 47 through the contact 50, the line 60, the electromagnets 42, 43, and then back to the source of supply through the line 59. In this manner the electromagnets 42 and 43 will be energized and will exert a force on the control board and consequently the axis of the gyroscope.

When the control board 39, which moves together and in parallel with the axis of the gyroscope, lies horizontal, the switch bars 46 and 47 will be pressed by the contact pieces 56 and 57 at the contact points 54, 55 provided at the vertical portions of the switch bars, and the other ends 50 and 51 will be raised free from contact with the extensions 52 and 53 provided at the upper edges of the mercury level. In this case the circuit of the electromagnets at either side of the vertical shaft 16 is broken, and the controlling means will not operate at all.

If, however, by any reason whatsoever, the axis of the gyroscope and consequently the control board 39 become inclined with respect to a horizontal plane, one of the pairs of electromagnets will be called into play to exert an opposing force to such deviation of the gyroscope. To take a concrete example, let us suppose that the control board has become inclined in such a manner that its right hand end has risen and the left hand end descended, as shown somewhat exaggerated in Figure 2. Consequently, the left switch bar 46 becomes depressed at the contact point 54, and the contact 51 rises and becomes detached from the extension 53, while the right switch bar 47, having been freed, will fall by its own weight on to the extension 52, closing the circuit of the electromagnets 42 and 43 as explained above. Therefore these electromagnets will be energized and a force will be exerted upon the gyroscope to oppose its deviation from the horizontal direction.

This force of opposition acting in a vertical plane will call forth a precession in a horizontal plane, and the whole movable system including the gyroscope, vertical shaft 16 and the parts attached thereto, will rotate upon the bearing 17.

This rotation around the vertical axis, however, will be limited by the observer operating the handle 31 or by any other suitable mechanical means, whereby the opposing horizontal force will be exerted. This horizontal force will call forth a precessional motion in a vertical plane and the gyroscope will be driven in such a direction as if it had directly been driven by the electromagnets 42, 43. The axis of the gyroscope will thus swing in the vertical plane and will eventually pass over the horizontal position and shoot over to the opposite side, to be acted upon by the other pair of electromagnets 40, 41, producing in turn a horizontal precessional motion in the opposite direction.

In this manner, the supporting board 24, which is connected with the gyroscope by means of the vertical rod 32, together with the parts mounted on the said supporting board, will swing successively around a horizontal and then the vertical axes.

The horizontal distances of the contact points 54, 55 of the switch bars from the respective pivotal points 48, 49 being small compared to those of the contact points 50, 51, the slightest deviation of the gyroscopic axis from the horizontal direction is sufficient to call the controlling means into play. Therefore, the vibration of the supporting board 24 which takes place all the time is hardly perceptible and it may very well be considered from a practical point of view that the supporting board always lies in a horizontal plane.

If it is desired to rotate the telescope in azimuth, it is necessary simply to apply force, say at the operating handle 31, in the direction in which the apparatus should turn. Then this force applied in a horizontal plane will produce a precessional motion in a vertical plane, which when opposed by the electrodynamic controlling means, will again be transformed into a precession in the horizontal plane. This final motion takes place in the same direction as the first applied force, so that it will appear as though it had directly been caused by the force applied at the handle 31.

The rotor of the three phase induction motor should of course be balanced as far as possible to minimize the vibrations. The combination of the mercury trough in co-operation with the resilient springs provided on the bottom of the annular float, and the inner and outer rings pivoted at the trunnions situated at mutually right angles, all of these together being connected by the spiral springs with the external casing, will serve to prevent the transmission of the slightest disturbance taking place outside the device. Therefore the surface of the mercury in the U-shaped vessel will maintain a true horizontal plane. Also the whole moving system being assembled in such a manner that the centre of gravity lies sufficiently below the float in the annular trough, the vertical main shaft will remain normally in an upright position.

When the head of the ship turns, the turning will simply cause a rotation of the system around the vertical shaft 16 at the bearing 17. A horizontal couple resulting from a slight friction at the bearing will lead to a precession in a vertical plane and will cause a series of oscillating motions in the limits prescribed by the clearance provided on the switch bars, exactly in the manner described above. In this case, the vertical connecting bar 32 passing through the foundation disc 10 will travel in the space 14 between the radial portions 13. If the turning of the ship be so great that the system cannot be turned on the disc because of the existence of the radial portions 13, the foundation disc 10 itself can be turned in the mercury trough 1.

In the drawing and in the above description, I have shown two pairs of electromagnets as the means to exert a force to suppress tilt of the gyroscope, but they can be replaced by any suitable means, such as an electric motor properly connected to the casing of the gyrowheel at one of the trunnions 22 which is in perpendicular relation to the direction of the axis 25 of the wheel so that it will exert an opposing turning moment when the wheel becomes inclined to the horizontal direction. Also it is evident that U-shaped level can be provided separately from the device.

I claim:

1. A device for holding a body at a fixed angular position with respect to the horizontal, comprising a vertical shaft; a gyroscope carried thereby; a control board connected to the gyroscope casing to tilt with the same; electrical means for setting up forces to resist tilting of the gyroscope axis in different directions about a horizontal axis; a supporting member carried by said shaft; and a plurality of switches embodying switch bars fulcrumed on said member and directly operated by the control board to open or close the circuit of said electrical means.

2. A device for holding a body at a fixed angular position with respect to the horizontal, comprising a vertical shaft; a gyroscope carried thereby; a control board connected to the gyroscope casing to tilt with the same; a group of magnets attached to said shaft and a group of companion magnets carried by the control board for setting up forces to resist tilting of the gyroscope axis in different directions about a horizontal axis; a plurality of switches; and conductors extending between the magnets and switches, said switches being operated by the control board to open or close the circuit of the magnets.

3. A device for holding a body at a fixed angular position with respect to the horizontal, comprising a vertical shaft; a gyroscope carried thereby; a control board connected to the gyroscope casing to tilt with the same; a group of magnets attached to said shaft and a group of companion magnets carried by the control board for setting up forces to resist tilting of the gyroscope axis in different directions about a horizontal axis; a supporting member carried by said shaft; a plurality of switches embodying switch bars fulcrumed on said member; and conductors extending between the magnets and the switch bars, said bars being directly operated by the control board to open or close the circuit of the magnets.

4. A device for holding a body at a fixed angular position with respect to the horizontal, comprising a gyroscope, a controlling board connected to the gyroscope casing, a mercury level, a float in said level, a switch bar fulcrumed on the said float and playing in the space between the said level and controlling board, and electrical means to produce force to suppress any tilt of the axis of the gyroscope with reference to a horizontal axis, the said switch-bar closing or opening the circuit of said electrical means.

5. A device for holding a body at a fixed angular position with respect to the horizontal, comprising a gyroscope, a controlling board connected to the gyroscope casing, electrical means to produce force to suppress any tilt of the axis of gyroscope with reference to a horizontal axis, a mercury level, a float in said level, and a switch bar fulcrumed on the said float to close and open the circuit of said electrical means, said switch bar being so disposed that a slight tilt of the gyroscope causes a wide separation of the contact points of the said electric circuit.

In testimony whereof I affix my signature.

TADAYOSHI UMETSU.